(12) United States Patent
Winzer (10) Patent No.: US 8,155,534 B2
(45) Date of Patent: Apr. 10, 2012

(54) OPTICAL MODULATOR FOR HIGHER-ORDER MODULATION

(75) Inventor: Peter J. Winzer, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 867 days.

(21) Appl. No.: 12/164,519

(22) Filed: Jun. 30, 2008

(65) Prior Publication Data
US 2009/0324253 A1 Dec. 31, 2009

(51) Int. Cl.
*H04B 10/04* (2006.01)
(52) U.S. Cl. ......... 398/185; 398/186; 398/188; 398/201
(58) Field of Classification Search .......... 398/185–186, 398/188, 201
See application file for complete search history.

(56) References Cited

U.S. PATENT DOCUMENTS

| 2003/0079233 | A1* | 4/2003 | Matthews et al. ............. 725/129 |
| 2003/0156774 | A1 | 8/2003 | Conradi |
| 2004/0028418 | A1 | 2/2004 | Kaplan et al. |
| 2004/0038648 | A1* | 2/2004 | Matsuura et al. ............. 455/101 |
| 2006/0072924 | A1 | 4/2006 | Lee et al. |
| 2007/0092265 | A1* | 4/2007 | Vrazel et al. .................. 398/189 |
| 2007/0116476 | A1 | 5/2007 | Bai |

OTHER PUBLICATIONS

PCT International Search Report dated Feb. 5, 2010, for International Application No. PCT/US2009/003846, filed on Jun. 29, 2009.
A.P.T. Lau and J.M. Kahn, "Signal Design and Detection in Presence of Nonlinear Phase Noise," Journal of Lightwave Technology, 2007, v. 25, pp. 3008-3016.
M. Seimetz, et al. "Optical Systems with High-Order DPSK and Star QAM Modulation Based on Interferometric Direct Detection," Journal of Lightwave Technology, 2007, v. 25, pp. 1515-1530.
J. Hongo, et al. "1-Gsymbol/s 64-QAM Coherent Optical Transmission over 150 km," IEEE Photonics Technology Letters, 2007, v. 19, pp. 638-640.
K. Sekine, et al. "Modulation Parameter Tolerance for 8- and 16-APSK Signals," Proceedings of Optical Fiber Communications Conference (OFC'06), paper JThB13, 2006 (3 pages).
M. Ohm and J. Speidel, "Receiver Sensitivity, Chromatic Dispersion Tolerance and Optimal Receiver Bandwidth for 40 Gbit/s 8-Level Optical ASK-DQPSK and Optical 8-DPSK," ITG-Fachtagung Photonische Netze, Leipzig, Germany, May 2005, pp. 211-217.
P.J. Winzer and R.-J. Essiambre, "Advanced Optical Modulation Formats," Proc. IEEE, 2006, vol. 94(5), pp. 952-985.

* cited by examiner

*Primary Examiner* — Leslie Pascal
(74) *Attorney, Agent, or Firm* — Mendelsohn, Drucker & Associates, P.C.; Yuri Gruzdkov; Steve Mendelsohn (57) ABSTRACT

According to one embodiment of the invention, a 16-QAM optical modulator has a Mach-Zehnder modulator (MZM) coupled to a drive circuit that drives the MZM based on two electrical binary signals. The output of the MZM corresponds to an intermediary constellation consisting of four constellation points arranged on a straight line in the corresponding in-phase/quadrature-phase (I-Q) plane. Two of these constellation points correspond to a zero phase, and the remaining two constellation points correspond to a phase of $\pi$ radian. The 16-QAM optical modulator further has a phase shifter that modulates the output of the MZM based on two additional electrical binary signals. The resulting optical output signal corresponds to a star 16-QAM constellation, which is produced by incremental rotation of the intermediary constellation.

18 Claims, 5 Drawing Sheets

OPTICAL MODULATOR FOR HIGHER-ORDER MODULATION

BACKGROUND OF THE INVENTION

1. Field of the Invention

The present invention relates to optical communication equipment and, more specifically, to optical modulators for generation of amplitude- and/or phase-modulated signals.

2. Description of the Related Art

This section introduces aspects that may help facilitate a better understanding of the invention(s). Accordingly, the statements of this section are to be read in this light and are not to be understood as admissions about what is in the prior art or what is not in the prior art.

The ever-increasing demand for transmission capacity and a variety of limitations on spectral bandwidth in optical communication systems bring about the use of "spectrally efficient" modulation formats. Such modulation formats are generally based on higher-order optical modulation, e.g., 8-ary and higher QAM (quadrature amplitude modulation) and APSK (amplitude- and phase-shift keying). Various subspecies of QAM and APSK are described, e.g., in (1) A. P. T. Lau and J. M. Kahn, "Signal Design and Detection in Presence of Nonlinear Phase Noise," Journal of Lightwave Technology, 2007, v. 25, pp. 3008-3016; (2) M. Seimetz, et al. "Optical Systems with High-Order DPSK and Star QAM Modulation Based on Interferometric Direct Detection," Journal of Lightwave Technology, 2007, v. 25, pp. 1515-1530; (3) J. Hongo, et al. "1-Gsymbol/s 64-QAM Coherent Optical Transmission over 150 km," IEEE Photonics Technology Letters, 2007, v. 19, pp. 638-640; (4) K. Sekine, et al. "Modulation Parameter Tolerance for 8- and 16-APSK Signals," Proceedings of Optical Fiber Communications Conference (OFC'06), paper JThB13, 2006; and (5) M. Ohm and J. Speidel, "Receiver Sensitivity, Chromatic Dispersion Tolerance and Optimal Receiver Bandwidth for 40 Gbit/s 8-Level Optical ASK-DQPSK and Optical 8-DPSK," ITG-Fachtagung Photonische Netze, Leipzig, Germany, May 2005, pp. 211-217, all of which are incorporated herein by reference in their entirety.

A representative prior-art optical modulator suitable for higher-order modulation at a relatively high modulation speed (e.g., greater than 10 Gbaud) employs a relatively large number of light-modulating elements, each having a corresponding drive circuit. As a result, the overall complexity of the optics and electronics involved in the implementation of prior-art higher-order optical modulators is relatively high. Disadvantageously, this complexity renders those optical modulators impractical and/or cost ineffective.

SUMMARY OF THE INVENTION

According to one embodiment of the invention, a 16-QAM optical modulator has a Mach-Zehnder modulator (MZM) coupled to a drive circuit that drives the MZM based on two electrical binary signals. The output of the MZM corresponds to an intermediary constellation consisting of four constellation points arranged on a straight line in the corresponding in-phase/quadrature-phase (I-Q) plane. Two of these constellation points correspond to a zero phase, and the remaining two constellation points correspond to a phase of $\pi$ radians. The 16-QAM optical modulator further has a phase shifter that modulates the output of the MZM based on two additional electrical binary signals. The resulting optical output signal corresponds to a star 16-QAM constellation, which is substantially produced by incremental rotation of the intermediary constellation.

According to another embodiment, an optical device comprises: (A) a Mach-Zehnder modulator (MZM) adapted to modulate a phase and an amplitude of an optical input signal and (B) a first drive circuit adapted to drive the MZM based on j+1 electrical binary signals so as to cause the MZM to impose either a first phase shift or a second phase shift that differs from the first phase shift by about $\pi$ radians, where j is a positive integer. The optical device is adapted to apply $2^{k-1}$ different phase shifts based on k−1 additional electrical binary signals to further modulate the phase and produce a modulated optical output signal corresponding to a star M-QAM constellation, where k is an integer greater than one and $M=2^{j+k}$.

According to yet another embodiment, an optical device comprises: (A) an optical modulator adapted to modulate an optical input signal to produce a modulated optical output signal and (B) a drive circuit adapted to drive the optical modulator based on j+1 electrical binary signals, where j is a positive integer. The drive circuit comprises a plurality of amplifiers, each adapted to amplify a respective one of said j+1 electrical binary signals to produce a corresponding amplified electrical signal. The drive circuit is further adapted to combine the resulting j+1 amplified electrical signals to produce a multilevel drive signal for driving the optical modulator.

According to yet another embodiment, a method of modulating an optical signal comprises the steps of: (A) modulating a phase and an amplitude of an optical input signal using a Mach-Zehnder modulator (MZM) and based on j+1 electrical binary signals, wherein the MZM imposes either a first phase shift or a second phase shift that differs from the first phase shift by about $\pi$ radians, where j is a positive integer; and (B) further modulating the phase by applying $2^{k-1}$ different phase shifts based on k−1 additional electrical binary signals to produce a modulated optical output signal corresponding to a star M-QAM constellation, where k is an integer greater than one and $M=2^{j+k}$.

According to yet another embodiment, an optical device comprises: (A) an optical modulator adapted to modulate a phase and an amplitude of an optical input signal and (B) a first drive circuit adapted to drive the optical modulator based on j+1 electrical binary signals so as to cause the optical modulator to impose either a first phase shift or a second phase shift that differs from the first phase shift by about $\pi$ radians, where j is a positive integer. The optical device is adapted to apply $2^{k-1}$ different phase shifts based on k−1 additional electrical binary signals to further modulate the phase and produce a modulated optical output signal corresponding to a star M-QAM constellation, where k is an integer greater than one and $M=2^{j+k}$.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Figure 1:
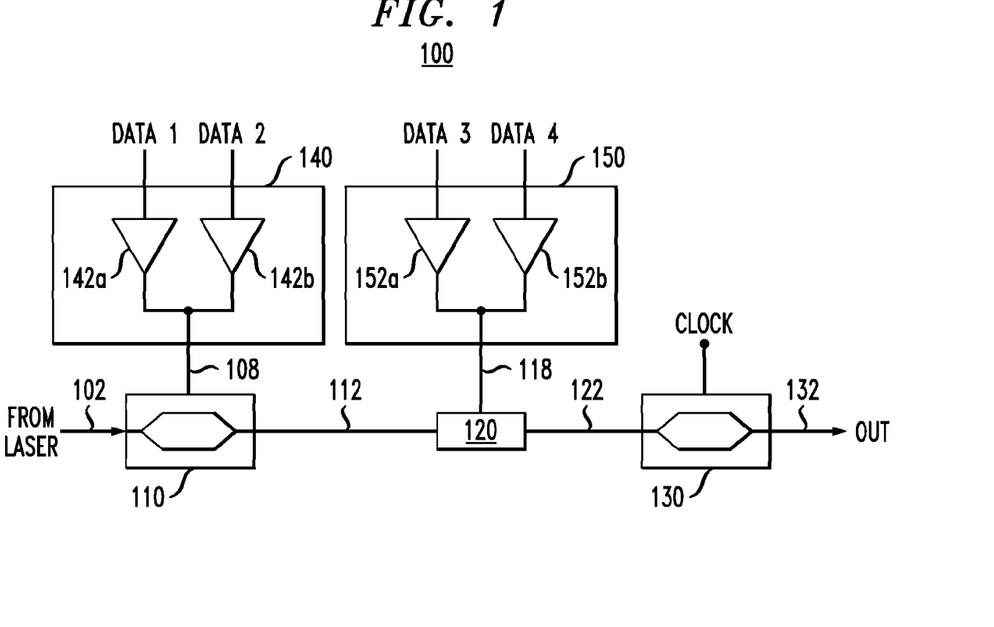
FIG. 1 shows a block diagram of a higher-order optical modulator according to one embodiment of the invention.

FIG. 1 shows a block diagram of a higher-order optical modulator 100 according to one embodiment of the invention. Modulator 100 receives four electrical binary signals Data 1 ... Data 4 and generates a corresponding modulated optical output signal 132. Signal 132 can be classified as a 2-ASK/8-PSK signal, where the acronyms 2-ASK and 8-PSK stand for binary amplitude-shift keying and 8-ary phase-shift keying, respectively.

Figure 2:
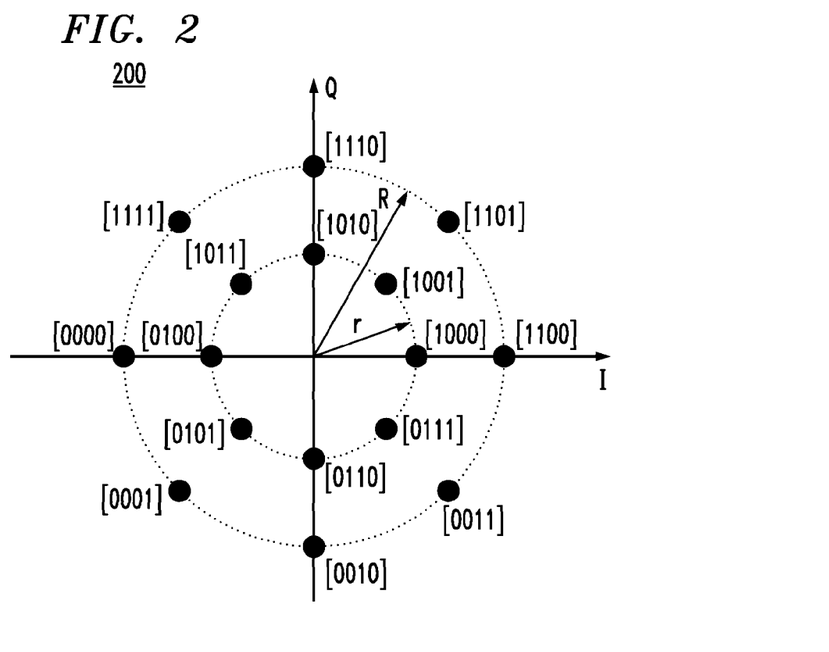
FIG. 2 graphically shows a star 16-QAM constellation corresponding to an optical output signal of the modulator shown in FIG. 1.

FIG. 2 graphically shows a star 16-QAM constellation 200 corresponding to signal 132. Constellation 200 has (i) eight constellation points arranged on a circle of radius r and (ii) eight constellation points arranged on a circle of radius R, where R>r. The angular separation between adjacent constellation points on each of the circles is 45 degrees. Four constellation points of constellation 200 fall on the in-phase (I) axis, and four other constellation points fall on the quadrature-phase (Q) axis. The bracketed binary values placed next to each constellation point in FIG. 2 show representative bit mapping for a four-bit signal composed of signals Data 1 ... Data 4 (see FIG. 1). This bit mapping is described in more detail below. One skilled in the art will readily appreciate that the bit mapping can be altered, e.g., by utilizing a suitable binary preceding method and/or external preceding devices (not explicitly shown in FIG. 1. In a representative embodiment, the ratio of r/R is between about 0.2 and about 0.8, e.g., 0.5.

Referring back to FIG. 1, modulator 100 has a Mach-Zehnder modulator (MZM) 110 coupled to a drive circuit 140. MZM 110 receives an optical input (e.g., continuous-wave) signal 102 from a laser (not explicitly shown in FIG. 1) and, in response to a drive signal 108 received from drive circuit 140, generates a modulated optical signal 112. Signal 112 is then applied to a phase shifter 120.

Drive circuit 140 generates drive signal 108 based on binary signals Data 1 and Data 2. In drive circuit 140, signals Data 1 and Data 2 are applied to amplifiers 142a-b, respectively. Typically, signals Data 1 and Data 2 are zero-mean (e.g., ac-coupled high-speed) digital signals having the same rail separation. For example, the lower and upper rails of those signals might be at −1 V and +1 V, respectively. Drive circuit 140 is configured to use a dc bias voltage ($V_0$) that causes drive signal 108 on average to swing symmetrically to both sides around a voltage that produces the highest possible light extinction in MZM 110 (i.e., correspond to an optical null of the MZM). In other words, if drive signal 108 is at voltage $V_0$, then MZM 110 transmits substantially no light, thereby nulling signal 112.

Amplifiers 142a-b are configured to provide signal gains $g_a$ and $g_b$, respectively, the relative values of which can be expressed, for example, as follows:

$$g_a = \frac{1}{2}(R + r) \quad (1a)$$

$$g_b = \frac{1}{2}(R - r) \quad (1b)$$

Based on signal Data 1, amplifier 142a produces a bi-level output signal having voltages $+g_a\Delta V_{1/2}$ and $-g_a\Delta V_{1/2}$, where $\Delta V_{1/2}$ is one half of the separation between the upper and lower rails in signals Data 1/Data 2. Similarly, based on signal Data 2, amplifier 142b produces a bi-level output signal having voltages $+g_b\Delta V_{1/2}$ and $-g_b\Delta V_{1/2}$. The output signals of amplifiers 142a-b are summed and the resulting signal is superimposed onto bias voltage $V_0$.

Table 1 shows characteristics of optical signal 112 as a function of binary signals Data 1 and Data 2.

TABLE 1

| MZM Output as a Function of Data 1 and Data 2 | | |
|---|---|---|
| [Data 1] [Data 2] | Output Intensity | Output Phase |
| 00 | $I_R$ | π |
| 01 | $I_r$ | π |
| 10 | $I_r$ | 0 |
| 11 | $I_R$ | 0 |

In this table, $I_R$ and $I_r$ denote intensities corresponding to the outer and inner circles, respectively, of constellation 200.

The signal characteristics shown in Table 1 can be understood if one recalls transfer properties of a chirp-free MZM, e.g., implemented using an X-cut electro-optic material, such as $LiNbO_3$, GaAs, or InP, or differentially driven in a push-pull configuration. More specifically, the MZM has a $\cos^2$ transfer function, with multiple lobes of that function separated by the corresponding null points. If the MZM is driven with a drive signal that remains within a single lobe of the transfer function, then the MZM produces an amplitude-modulated optical signal that is substantially chirp free. However, if the drive signal is not confined to a single lobe of the transfer function and can cross a null voltage (e.g., $V_0$) into an adjacent lobe, then such crossing causes a discrete phase increment of about π radians in the MZM's optical output, thereby imparting both amplitude and (digital) phase modulation.

As explained above, signal 108 uses voltage $V_0$ as a base voltage, around which it swings back and forth. Of the four possible levels in signal 108, two levels correspond to one lobe of the transfer function and the other two correspond to an adjacent lobe. As a result, in addition to an amplitude modulation indicated in the second column of Table 1, MZM 110 imparts a phase modulation indicated in the third column of the table. To summarize, the above-described modulation scheme maps the two-bit input signal composed of signals Data 1 and Data 2 onto an intermediary constellation consisting of four constellation points arranged on a straight line in the I-Q plane. Two of these constellation points correspond to a zero phase, and the remaining two constellation points correspond to a phase of π radians.

Phase shifter 120 modulates the phase of optical signal 112 in response to a drive signal 118 generated by a drive circuit 150. Functionally, phase shifter 120 and drive circuit 150 serve to rotate the four constellation points corresponding to optical signal 112 by a set of different discrete angles, in this particular example, by a set of four different angles, each corresponding to a different binary value of the two-bit signal composed of signals Data 3 and Data 4. This rotation enables a modulated optical signal 122 produced by phase shifter 120 to have any of the sixteen optical symbols corresponding to the sixteen constellation points of constellation 200.

In drive circuit 150, signals Data 3 and Data 4 are applied to amplifiers 152a-b that are similar to amplifiers 142a-b, respectively, of drive circuit 140. The output signals of amplifiers 152a-b are summed to generate drive signal 118. In response to drive signal 118, phase shifter 120 introduces, between optical signals 112 and 122, a relative phase shift that is proportional to the drive voltage.

Based on signal Data 3, amplifier 152a produces a bi-level output signal having voltages $+\Delta V_{\pi/4}$ and $-\Delta V_{\pi/4}$, where $\Delta V_{\pi/4}$ is a voltage that corresponds to a 45-degree phase shift in phase shifter 120. Similarly, based on signal Data 4, amplifier 152b produces a bi-level output signal having voltages $+\Delta V_{\pi/8}$ and $-\Delta V_{\pi/8}$, where $\Delta V_{\pi/8}$ is a voltage that corresponds to a 22.5-degree phase shift in phase shifter 120 and, in the linear phase-shifter regime, $\Delta V_{\pi/8} = \Delta V_{\pi/4}/2$. If signals Data 3 and Data 4 have the same rail separation, then the signal gain of amplifier 152a is set to be about two times greater than the signal gain of amplifier 152b.

Table 2 shows drive voltage $V_d$ applied by drive circuit 150 to phase shifter 120 and the resulting phase shift introduced by the phase shifter as a function of binary signals Data 3 and Data 4.

TABLE 2

Drive Voltage and Phase Shift as a Function of Data 3 and Data 4

| [Data 3] [Data 4] | $V_d - V_1$ | Phase Shift |
| --- | --- | --- |
| 00 | $-3\Delta V_{\pi/8}$ | $-3\pi/8$ |
| 01 | $-\Delta V_{\pi/8}$ | $-\pi/8$ |
| 10 | $+\Delta V_{\pi/8}$ | $\pi/8$ |
| 11 | $+3\Delta V_{\pi/8}$ | $3\pi/8$ |

The combined effect of MZM 110 and phase shifter 120 is to map the four-bit signal composed of signals Data 1 ... Data 4 onto constellation 200 as indicated by the corresponding bracketed binary values placed next to each constellation point in FIG. 2. In each of the binary values, the first bit corresponds to signal Data 1; the second bit corresponds to signal Data 2; etc.

Optical signal 122 can optionally be applied to a pulse carver 130 configured to transform that signal into a return-to-zero (RZ) optical signal 132 having a desired duty cycle. In the embodiment shown in FIG. 1, pulse carver 130 is implemented using an MZM driven by an appropriately scaled clock signal. One skilled in the art will appreciate that various pulse carvers can be employed as pulse carver 130, e.g., as summarized in P. J. Winzer and R.-J. Essiambre, "Advanced Optical Modulation Formats," Proc. IEEE, 2006, vol. 94(5), pp. 952-985, which is incorporated herein by reference in its entirety.

Advantageously over a typical prior-art star 16-QAM optical modulator, modulator 100 employs fewer light modulating elements, such as MZMs and phase shifters, and/or drive signals having fewer levels. For example, a prior-art star 16-QAM optical modulator is typically based on an 8-PSK modulation scheme and is implemented using an eight-level drive signal or eight separate phase shifters. In contrast, modulator 100 is based on a 4-PSK modulation scheme and is implemented using a four-level drive signal and a single phase shifter.

Figure 3:
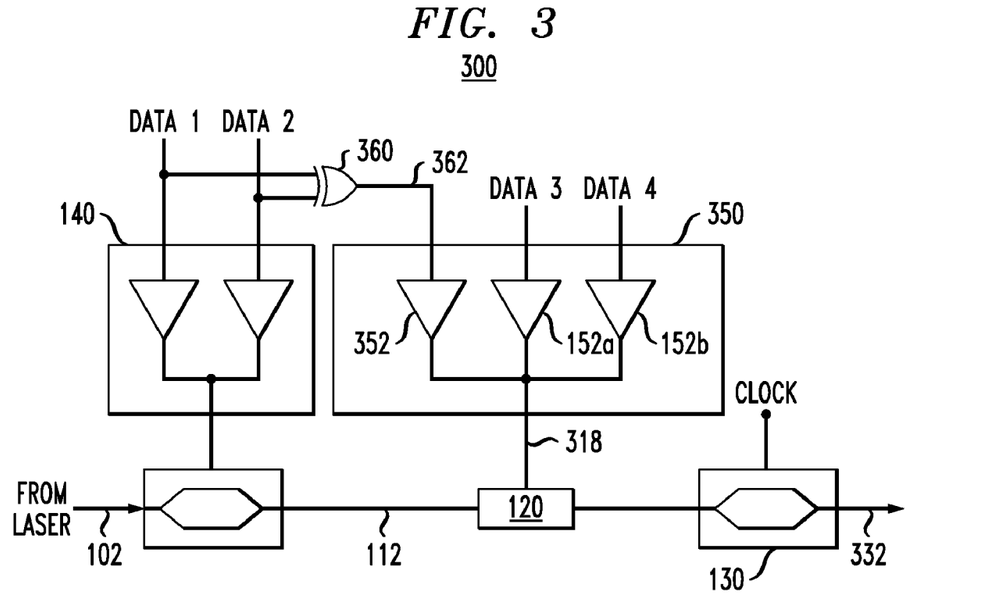
FIG. 3 shows a block diagram of a higher-order optical modulator according to another embodiment of the invention.

FIG. 3 shows a block diagram of a higher-order optical modulator 300 according to another embodiment of the invention. Modulator 300 is generally analogous to modulator 100 (FIG. 1) and has many of the same components. However, in modulator 300, drive circuit 150 is replaced by drive circuit 350. Drive circuit 350 differs from drive circuit 150 in that it has an additional amplifier 352. Modulator 300 also has an XOR gate 360, for which signals Data 1 and Data 2 serve as input signals. An output data signal 362 produced by XOR gate 360 is applied to amplifier 352. The output signal of amplifier 352 is summed with the output signals of amplifiers 152a-b.

Amplifier 352 is similar to each of amplifiers 152a-b. Based on data signal 362, amplifier 352 produces a bi-level output signal having voltages $+\Delta V_{\pi/16}$ and $-\Delta V_{\pi/16}$, where $\Delta V_{\pi/16}$ is a voltage that corresponds to an 11.25-degree phase shift in phase shifter 120. Within the linearity range of phase shifter 120, $\Delta V_{\pi/16} = \Delta V_{\pi/8}/2 = \Delta V_{\pi/4}/4$. If data signal 362 has the same rail separation as signals Data 3 and Data 4, then the signal gain of amplifier 352 is set to be about two times smaller than the signal gain of amplifier 152b, or four times smaller than the signal gain of amplifier 152a.

Figure 4:
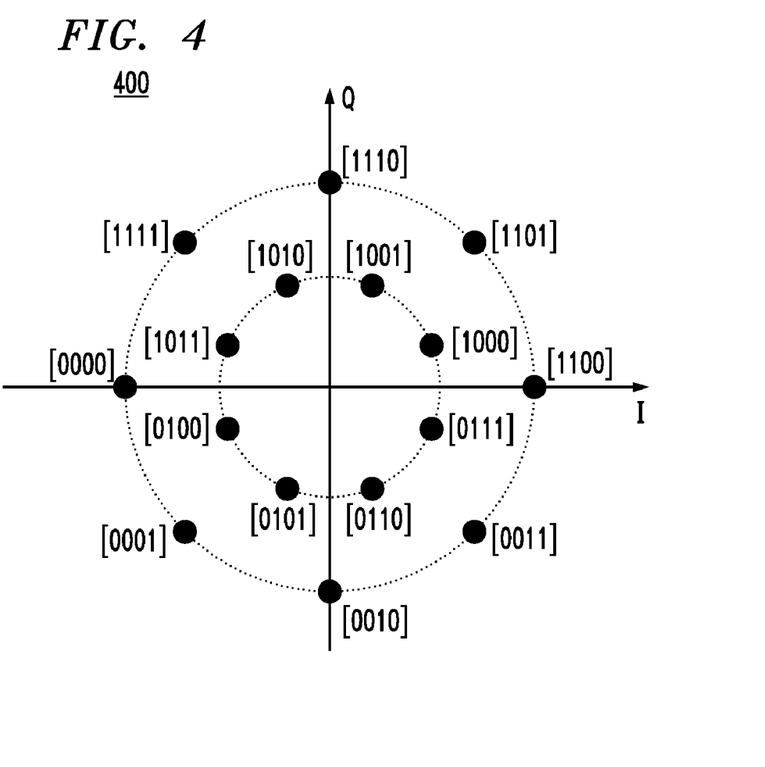
FIG. 4 graphically shows a star 16-QAM constellation corresponding to an optical output signal of the modulator shown in FIG. 3.

FIG. 4 graphically shows a star 16-QAM constellation 400 corresponding to an optical output signal 332 produced by modulator 300. Constellation 400 is generally analogous to constellation 200 (FIG. 2). However, one difference between constellations 200 and 400 is that, in the latter constellation, the inner circle is rotated with respect to the outer circle by about 22.5 degrees. In certain situations, the use of constellation 400 can be beneficial because of the constellation's resilience to certain signal impairments, e.g., detection noise and fiber nonlinearity.

As evident from Table 1 and the bit mapping shown in FIG. 2, the inner circle of constellation 200 has constellation points, for which the first two bits are either "01" or "10". An XOR function applied to either of these bit combinations results in a binary "1". Similarly, the outer circle of constellation 200 has constellation points, for which the first two bits are either "00" or "11". An XOR function applied to either of these bit combinations results in a binary "0". Thus, the two binary states of signal 362 can be used as respective identifiers for the two circles of constellation 200. These identifiers enable modulator 300 to distinguish constellation points corresponding to different circles of the constellation. Rotation of the inner circle with respect to the outer circle by 22.5 degrees performed in modulator 300 based on signal 362 effectively transforms constellation 200 into constellation 400. The bracketed binary values placed next to each constellation point in FIG. 4 show the resulting bit mapping for constellation 400.

Figure 5:
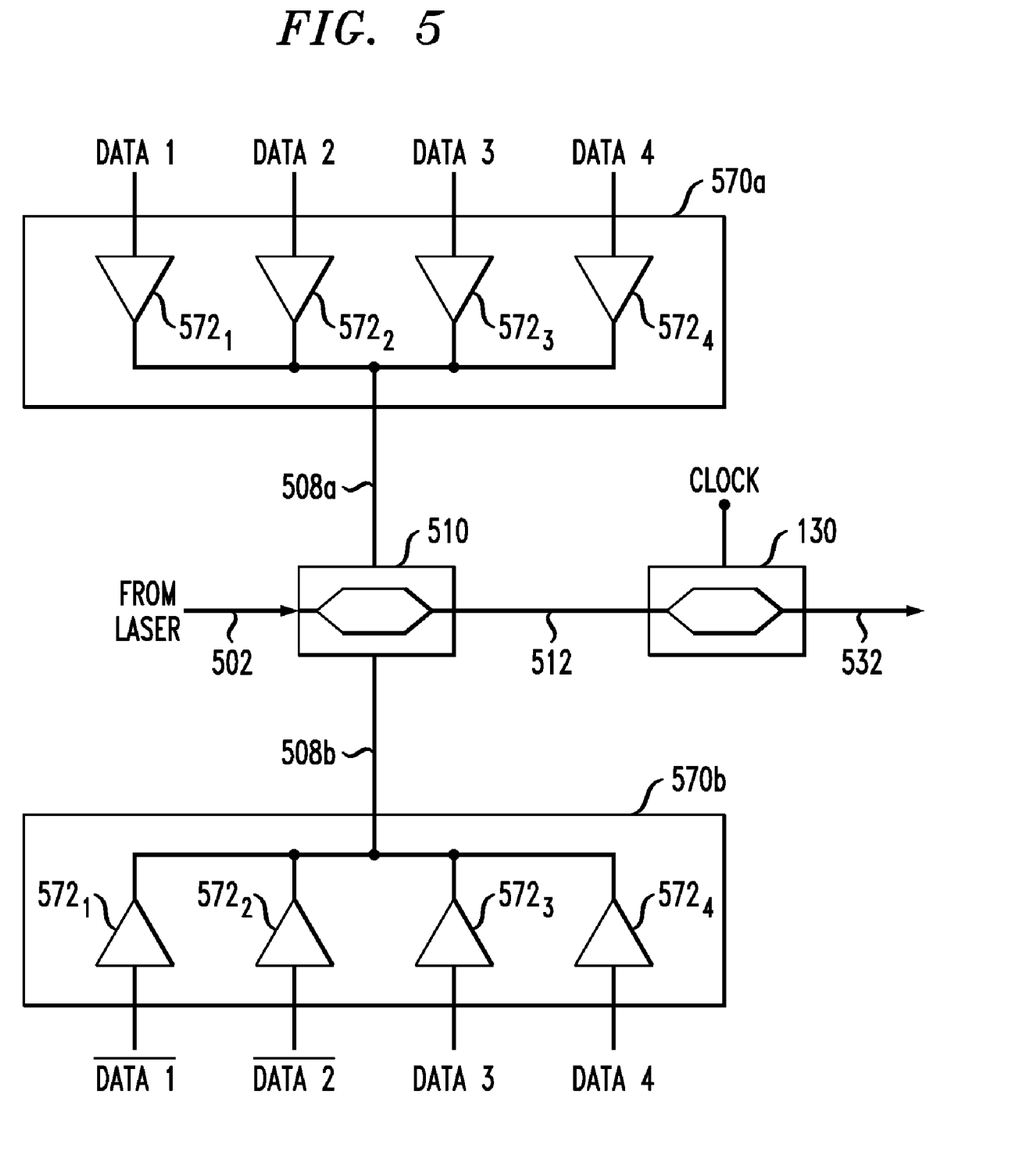
FIG. 5 shows a block diagram of a higher-order optical modulator according to yet another embodiment of the invention.

FIG. 5 shows a block diagram of a higher-order optical modulator 500 according to yet another embodiment of the invention. Modulator 500 has a dual-drive MZM 510 coupled to drive circuits 570a-b. MZM 510 receives an optical input (e.g., continuous-wave) signal 502 from a laser (not explicitly shown in FIG. 5) and, in response to drive signals 508a-b received from drive circuits 570a-b, respectively, generates a modulated optical signal 512. Signal 512 is then applied to optional pulse carver 130 to produce an RZ output signal 532. Both signals 512 and 532 correspond to constellation 200 (FIG. 2). Although modulator 500 receives eight electrical binary signals, only four of those signals, Data 1 ... Data 4, are independent data signals. The remaining four of the eight signals are either duplicate or inverted signals derived from the respective four independent signals.

Being a dual drive MZM, MZM 510 enables both push-pull and push-push operations. The push-pull operation is used to implement the amplitude and phase modulation described by Table 1. The push-push operation is used to implement the phase-shift keying described by Table 2. As already explained above, the combined effect of these two modulation schemes is the bit mapping shown in FIG. 2.

Each of drive circuits 570a-b has four amplifiers $572_1 \ldots 572_4$. Amplifiers $572_1$ and $572_2$ are generally analogous to amplifiers 142a and 142b, respectively (see FIG. 1). However, unlike amplifiers $572_1$ and $572_2$ of drive circuit 570a, amplifiers $572_1$ and $572_2$ of drive circuit $570_b$ are configured to receive inverted signals Data 1 and Data 2. In FIG. 5, the inversion operation is denoted by a horizontal bar over the respective signal tag. It is well known in the art that driving a dual-drive MZM with two drive signals corresponding to data and inverted data, respectively, results in a push-pull operation. In MZM 510, the push-pull operation enabled by the two pairs of amplifiers $572_1$ and $572_2$ produces the amplitude and phase modulation described by Table 1.

Amplifiers $572_3$ and $572_4$ are generally analogous to amplifiers 152a and 152b, respectively (see FIG. 1). However, the signal gains of amplifiers $572_3$ and $572_4$ are set to match the characteristics of MZM 510 rather than those of phase shifter 120. It is well known in the art that driving a dual-drive MZM with two identical drive signals results in a push-push operation. In MZM 510, the push-push operation enabled by the two pairs of amplifiers $572_3$ and $572_4$ imposes the phase modulation described by Table 2.

Although each of higher-order modulators 100, 300, and 500 is designed for a corresponding star 16-QAM constellation, such as constellation 200 (FIG. 2) or constellation 400 (FIG. 4), a similar approach can be used to implement a higher-order modulator for an arbitrary star M-QAM constellation, where $M=2^n$ and n is an integer greater than 2. For example, suppose that the star M-QAM constellation has $2^j$ concentric circles, each having $2^k$ constellation points, where each of j and k is a positive integer and j+k=n. Then, a higher-order modulator adapted for this constellation can be implemented, e.g., as follows.

The modulator is configured to receive n independent binary data signals. Of those n data signals, j+1 data signals are used to implement amplitude and phase modulation analogous to that described by Table 1. More specifically, the modulator has a drive circuit, e.g., analogous to drive circuit 140, with j+1 amplifiers, e.g., analogous to amplifiers 142 (see FIG. 1). The drive circuit is configured to drive an MZM, which produces a modulated optical signal corresponding to an intermediary constellation having $2^{j+1}$ constellation points located on a straight line in the I-Q plane. Of those $2^{j+1}$ constellation points, $2^j$ constellation points have an optical phase of 0 radians, and the remaining $2^j$ constellation points have an optical phase of $\pi$ radian.

The remaining k−1 (=n−(j+1)) data signals are used to implement phase-shift keying. More specifically, the modulator has a drive circuit, e.g., analogous to drive circuit 150, with k−1 amplifiers, e.g., analogous to amplifiers 152 (see FIG. 1). This drive circuit is configured to drive a phase shifter, which further modulates the modulated optical signal produced by the MZM. The effect of this modulation is to substantially rotate the intermediary constellation by $2^{k-1}$ different angles, thereby producing the desired star M-QAM constellation. Note that, for each of higher-order modulators 100, 300, and 500, the parameter values are as follows: n=4, j=1, and k=3.

If desirable, some or all of the constituent circles of the star M-QAM constellation can be rotated with respect to one or more of the other circles. For example, by applying a suitable logic function to some or all of the j+1 data signals used for driving the MZM, the modulator can produce a unique identifier for each of the constituent circles of the star M-QAM constellation. It is relatively straightforward to find such a function, e.g., by analyzing the bit mapping pattern in the star M-QAM constellation. Recall that, in the case of modulator 300 (FIG. 3), a suitable logic function is an exclusive OR function. The unique identifiers can then be used to impose different respective phase shifts on the constellation points arranged on different circles of the star M-QAM constellation, thereby effecting the desired rotation of those circles in the I-Q plane. Furthermore, by precoding the logic signal, as known in the art, prior to applying it to the drive circuit, any desirable bit-pattern-to-symbol mapping can be achieved.

Figure 6:
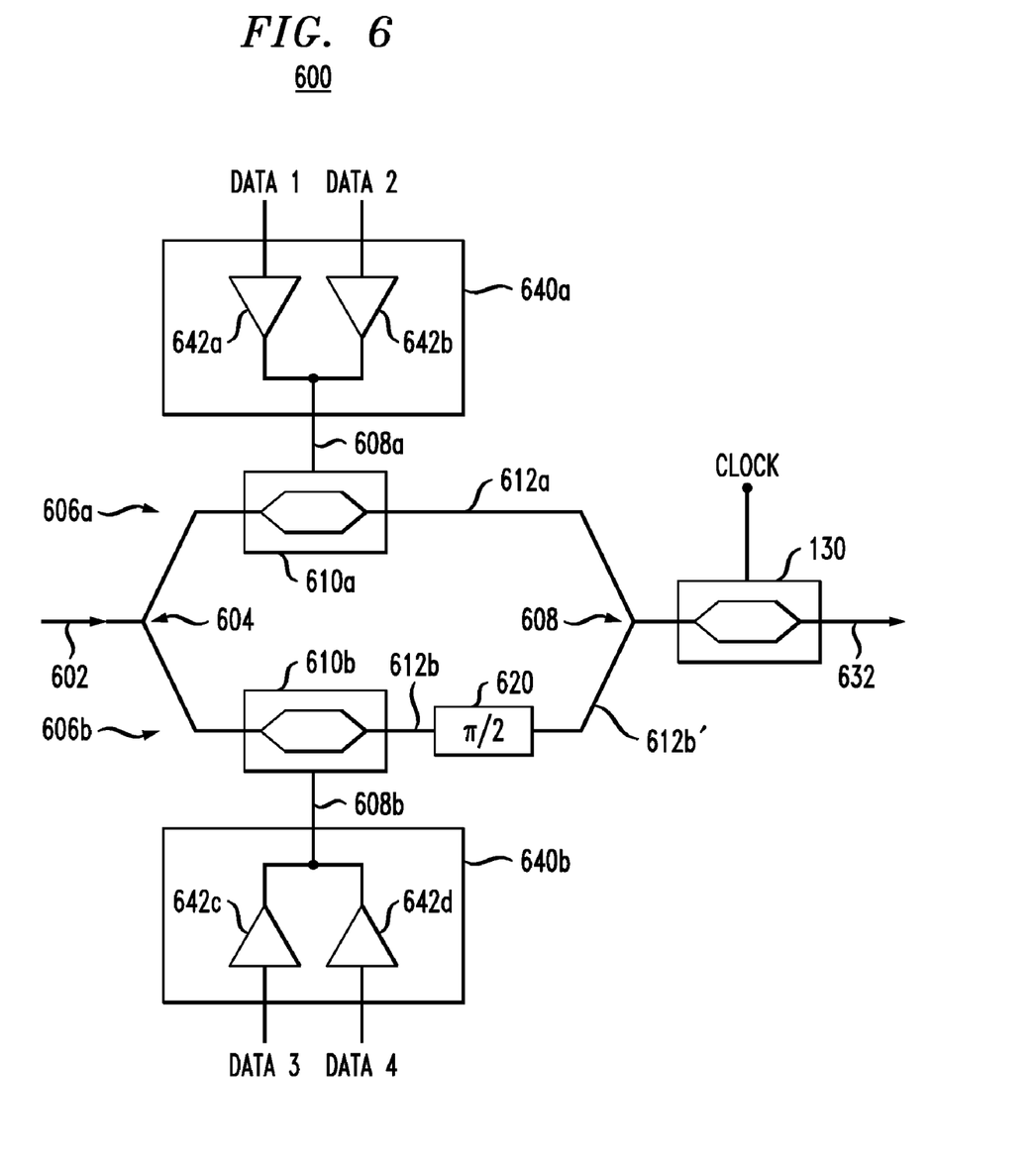
FIG. 6 shows a block diagram of a higher-order optical modulator according to yet another embodiment of the invention.

FIG. 6 shows a block diagram of a higher-order optical modulator 600 according to yet another embodiment of the invention. Modulator 600 receives four electrical binary signals Data 1 . . . Data 4 and generates a corresponding modulated optical output signal 632. Signal 632 is a rectilinear 16-QAM signal.

Figure 7:
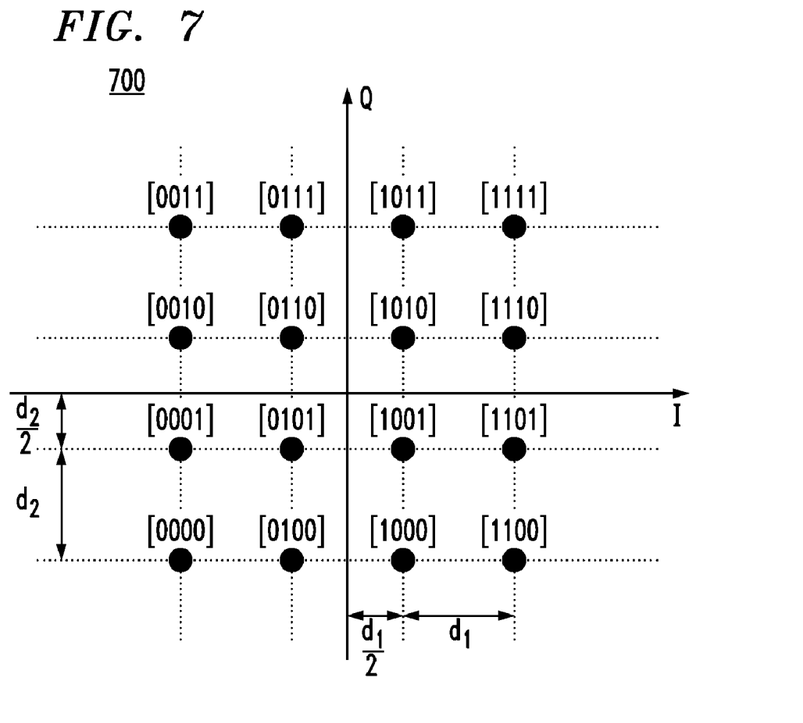
FIG. 7 graphically shows a rectilinear 16-QAM constellation corresponding to an optical output signal of the modulator shown in FIG. 6.

FIG. 7 graphically shows a rectilinear 16-QAM constellation 700 corresponding to signal 632. The horizontal (i.e., along the I axis) separation between adjacent constellation points is $d_1$, and the vertical (i.e., along the Q axis) separation between adjacent constellation points is $d_2$. In various implementations, $d_1$ and $d_2$ may have the same value or different values. The origin of the I and Q axes is centered inside the rectangle defined by the four inner constellation points. The bracketed binary values placed next to each constellation point show bit mapping for a four-bit signal composed of signals Data 1 . . . Data 4.

Referring back to FIG. 6, modulator 600 has two modulation branches 606a-b, each coupled between a power splitter 604 and a power combiner 608. Each of modulation branches 606a-b has an MZM 610 coupled to a respective drive circuit 640. Each of MZMs 610 receives, from power splitter 604, a respective portion of an optical input signal 602 and, in response to a drive signal 608 received from the respective drive circuit 640, modulates that portion to generate a respective modulated optical signal 612. A phase shifter 620 located in modulation branch 606b imposes a 90-degree phase shift onto signal 612b to produce signal 612b'. Signals 612a and 612b' are combined in power combiner 608. This modulator structure is often referred to as a QPSK modulator, I/Q modulator, or single-sideband modulator. The output of power combiner 608 is applied to optional pulse carver 130 (which was described above in reference to FIG. 1). The output of pulse carver 130 is signal 632.

Each of drive circuits 640a-b is generally analogous to drive circuit 140 (FIG. 1). Drive circuit 640a generates drive signal 608a based on binary signals Data 1 and Data 2, which are applied to amplifiers 642a-b, respectively, of that drive circuit. Similarly, drive circuit 640b generates drive signal 608b based on binary signals Data 3 and Data 4, which are applied to amplifiers 642c-d, respectively, of that drive circuit. The relative values of signal gains provided by amplifiers 642a-d can be expressed, for example, as follows:

$$g_a = d_1 \tag{2a}$$

$$g_b = \frac{1}{2} d_1 \tag{2b}$$

$$g_c = d_2 \tag{2c}$$

$$g_d = \frac{1}{2} d_2 \tag{2d}$$

Based on the corresponding data signal, each of amplifiers 642*a-d* produces a bi-level output signal having voltages $+g_x\Delta V_{1/2}$ and $-g_x\Delta V_{1/2}$, where $g_x$ is the corresponding signal gain given by one of Eqs. (2a)-(2d) and $\Delta V_{1/2}$ is one half of the rail separation in signals Data 1 . . . Data 4. In drive circuit 640*a*, the output signals of amplifiers 642*a-b* are summed and the resulting signal is superimposed onto a nulling bias voltage corresponding to MZM 610*a*. In drive circuit 640*b*, the output signals of amplifiers 642*c-d* are similarly summed and the resulting signal is superimposed onto a nulling bias voltage corresponding to MZM 610*b*. As already explained above in reference to Table 1, each of MZMs 610*a-b*, so driven, substantially maps the respective two-bit input signal onto an intermediary constellation composed of four constellation points lying on a straight line in the I-Q plane. Of those four constellation points, two constellation points have an optical phase of 0 radians, and the remaining two constellation points have an optical phase of π radians.

The effect of phase shifter 620 is to rotate the intermediary constellation corresponding to MZM 610*b* by 90 degrees with respect to the intermediary constellation corresponding to MZM 610*a*. As a result, power combiner 608 substantially functions as a complex number generator, for which modulation branches 606*a* and 606*b* supply real and imaginary parts, respectively. The combined effect of modulation branches 606*a* and 606*b* is to map the four-bit signal composed of signals Data 1 . . . Data 4 onto constellation 700 as indicated by the corresponding bracketed binary values placed next to each constellation point in FIG. 7. In each of those binary values, the first bit corresponds to signal Data 1; the second bit corresponds to signal Data 2; etc. One skilled in the art will appreciate that a different bit-to-symbol assignment can be achieved by preceding the binary input signals prior to applying them to the drive circuitry.

One common property of drive circuits 140, 150, 350, 570, and 640 is that each of them is designed to first amplify the corresponding binary data signals and then to combine the resulting amplified signals to form a multilevel drive signal used in the generation of the corresponding higher-order constellation, such as constellation 200, 400, or 700. As used herein, the term "multilevel" designates a signal having more than two levels. In contrast, a typical prior-art approach is to drive modulation branches 606*a-b* so as to first combine the corresponding binary data signals to form a multilevel signal and only then to amplify that multi-level signal to form a multilevel drive signal used in the generation of the corresponding higher-order constellation. Since the binary data signals are relatively low-voltage signals, e.g., on the order of 1 V, and the multilevel drive signals are relatively high-voltage signals, e.g., on the order of 10 V, the prior-art approach requires the drive circuit to employ an amplifier characterized by a relatively high degree of linearity over a relatively large voltage range. Furthermore, it should be noted that the use of a modulator having modulation branches 606*a-b* will generally result in relatively stringent quantization requirements. Hence, it might be advantageous to employ modulators analogous to 100 or 300 and/or drive circuits analogous to drive circuits 140, 150, 350, 570, and 640, the latter helping to significantly relax the amplifier-linearity specifications, thereby enabling the use of less-complicated and/or more-cost-effective amplification devices.

Figure 8:
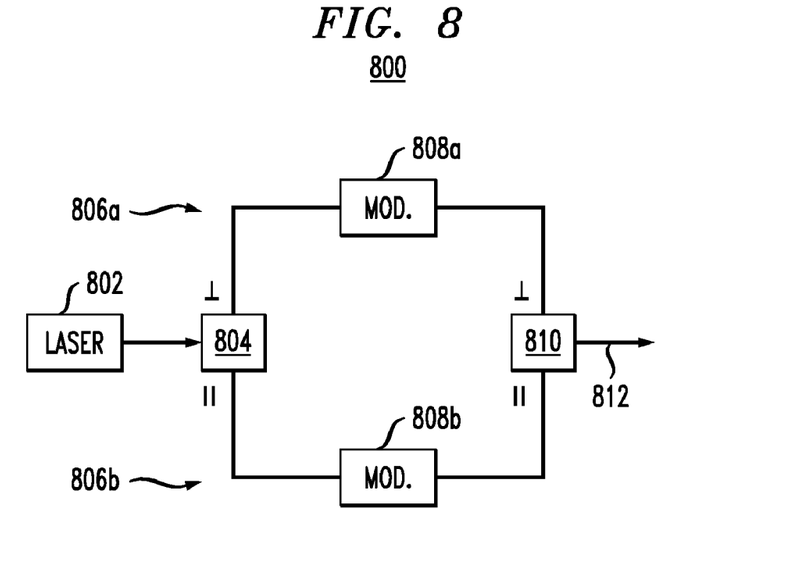
FIG. 8 shows a block diagram of an optical transmitter according to one embodiment of the invention.

FIG. 8 shows a block diagram of an optical transmitter 800 according to one embodiment of the invention. Transmitter 800 generates a polarization-multiplexed modulated optical signal 812 using two modulation branches 806*a-b*, each coupled between a polarization splitter 804 and a polarization combiner 810. Polarization splitter 804 splits an optical beam generated by a laser 802 into two orthogonal polarization components and applies them to modulation branches 806*a-b*, respectively. Each of modulation branches 806*a-b* has a respective optical modulator 808 that modulates the respective polarization component based on the signals that the modulator receives. Typically, modulators 808*a-b* receive different independent data signals. In various embodiments, modulator 808 can be any one of modulators 100, 300, 500, and 600. Polarization combiner 810 combines the modulated polarization components received from modulators 808*a-b* to produce optical signal 812. If modulators characterized by relatively weak polarization dependence are being used in optical transmitter 800, then it as also possible to have a shared optional pulse carver placed at the output of polarization combiner 810 instead of the two pulse carvers optionally used in modulators 808*a-b*.

As used in this specification, the term "star M-QAM constellation" refers to a constellation consisting of M constellation points arranged on two or more concentric circles. In one implementation, the constellation points are arranged in a wheel-and-spoke pattern, with each spoke (radius) containing two or more constellation points corresponding to different circles. In another implementation, the constellation points are arranged on their respective circles so that no spoke (radius) can contain more than a specified number of constellation points. For example, in a constellation having N circles, the constellation points can be arranged on their respective circles so that each spoke (radius) contains n constellation points corresponding to different circles, where n is any selected positive integer smaller than N+1. In a typical implementation, the angular separation between two adjacent constellation points on each of the circles is the same, but each circle may or may not have the same number of constellation points.

One skilled in the art will appreciate that an optical phase is usually measured with respect to some selected reference phase. In addition, optical phases that differ by a multiple integer of 2π are generally considered to have the same value. Thus, unless explicitly stated otherwise, the phrase "a phase shift of 0 radians" should not be interpreted as being limited to an absence of a phase shift. Similarly, one of the phase shifts referred to in the phrase "one or more different phase shifts" may be "a phase shift of 0 radians."

While this invention has been described with reference to illustrative embodiments, this description is not intended to be construed in a limiting sense. For example, certain embodiments of the invention can be implemented with optical modulators other than MZM-type modulators. For example, an optical modulator capable of producing an intermediary constellation consisting of $2^{j+1}$ constellation points arranged on a straight line in the I-Q plane, where j is a positive integer, can be composed of: (i) an amplitude modulator configured to generate $2^j$ different signal amplitudes and (ii) a phase shifter configured to controllably impose a zero phase shift or a phase shift of π radians onto the output of the amplitude modulator. Such an optical modulator can be configured to operate based on j+1 input binary signals and used in an embodiment of a higher-order optical modulator, e.g., in the position analogous to that of MZM 110 (FIG. 1 or FIG. 3) or MZM 610 (FIG. 6).

A logic circuit for generating QAM-constellation circle identifiers can be incorporated into optical modulator 500. Different binary signals, e.g., Data 1 . . . Data 4, can have different rail separations. Various modifications of the described embodiments, as well as other embodiments of the invention, which are apparent to persons skilled in the art to which the invention pertains are deemed to lie within the principle and scope of the invention as expressed in the following claims.

Embodiments of the invention may be implemented as circuit-based processes, including possible implementation as a single integrated circuit (such as a hybrid optoelectronic integrated circuit), a multi-chip module, a single card, or a multi-card circuit pack.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. An optical device, comprising:
   a Mach-Zehnder modulator (MZM) adapted to modulate a phase and an amplitude of an optical input signal; and
   a first drive circuit adapted to drive the MZM based on j+1 electrical binary signals so as to cause the MZM to impose either a first phase shift or a second phase shift that differs from the first phase shift by about $\pi$ radians, wherein the optical device is adapted to apply $2^{k-1}$ different phase shifts based on k−1 additional electrical binary signals to further modulate the phase and produce a modulated optical output signal corresponding to a star M-QAM constellation, where j is a positive integer, k is an integer greater than one, and $M=2^{j+k}$.

2. The invention of claim 1, wherein the first drive circuit is adapted to drive the MZM based on the j+1 electrical binary signals so as to produce $2^j$ different amplitudes in the modulated optical output signal.

3. The invention of claim 1, wherein said MZM is adapted to apply said $2^{k-1}$ different phase shifts and produce the modulated optical output signal.

4. The invention of claim 3, wherein:
   the MZM is a dual-drive MZM;
   the first drive circuit is further adapted to drive the MZM based on said k−1 additional electrical binary signals; and
   the optical device further comprises a second drive circuit adapted to drive the MZM based on said j+1 electrical binary signals and said k−1 additional electrical binary signals.

5. The invention of claim 4, wherein the first and second drive circuits are adapted to:
   drive the MZM to enable push-pull modulation using said j+1 electrical binary signals; and
   further drive the MZM to enable push-push modulation using said additional k−1 electrical binary signals.

6. The invention of claim 1, further comprising a phase shifter external to the MZM, which phase shifter is adapted to apply said $2^{k-1}$ different phase shifts.

7. The invention of claim 6, wherein:
   the MZM is adapted to generate an intermediary modulated optical signal corresponding to an intermediary constellation consisting of $2^{j+1}$ constellation points that are arranged on a straight line in a corresponding in-phase/quadrature-phase plane; and
   the application of said $2^{k-1}$ different phase shifts to the intermediary modulated optical signal results in incremental rotation of the intermediary constellation, said rotation producing the star M-QAM constellation.

8. The invention of claim 1, wherein j=1 and k=3.

9. The invention of claim 1, further comprising a logic circuit adapted to process some or all of the j+1 electrical binary signals to derive one or more identifiers for one or more circles of the star M-QAM constellation, wherein the optical device is further adapted to apply to the phase an additional phase shift based on said one or more identifiers.

10. The invention of claim 9, wherein:
    different identifiers correspond to different additional phase shifts; and
    the logic circuit comprises a logic element adapted to apply an exclusive OR function to two of the j+1 electrical binary signals.

11. The invention of claim 1, further comprising a pulse carver adapted to form a pulse train from the modulated optical output signal.

12. The invention of claim 1, wherein:
    the first drive circuit comprises a plurality of amplifiers, each adapted to amplify a respective one of said j+1 electrical binary signals to produce a corresponding amplified electrical signal; and
    the first drive circuit is adapted to combine the resulting j+1 amplified electrical signals to produce a multilevel drive signal for driving the MZM.

13. The invention of claim 12, wherein the first drive circuit is further adapted to:
    superimpose the multilevel drive signal onto a bias voltage corresponding to an optical null of the MZM; and
    drive the MZM with the resulting superimposed signal.

14. A method of modulating an optical signal, comprising:
    modulating a phase and an amplitude of an optical input signal using a Mach-Zehnder modulator (MZM) and based on j+1 electrical binary signals, wherein the MZM imposes either a first phase shift or a second phase shift that differs from the first phase shift by about $\pi$ radians, where j is a positive integer; and
    further modulating the phase by applying $2^{k-1}$ different phase shifts based on k−1 additional electrical binary signals to produce a modulated optical output signal corresponding to a star M-QAM constellation, where k is an integer greater than one and $M=2^{j+k}$.

15. The invention of claim 14, wherein the step of further modulating the phase is implemented using the MZM.

16. The invention of claim 14, wherein the step of further modulating the phase is implemented using a phase shifter external to the MZM, wherein:
the step of modulating the phase and the amplitude comprises (i) generating an intermediary modulated optical signal corresponding to an intermediary constellation consisting of $2^{j+1}$ constellation points that are arranged on a straight line in a corresponding in-phase/quadrature-phase plane and (ii) applying the intermediary modulated optical signal to the phase shifter;
the step of further modulating the phase results in incremental rotation of the intermediary constellation, said rotation producing the star M-QAM constellation.

17. The invention of claim 14, further comprising:
based on some or all of the j+1 electrical binary signals, deriving one or more identifiers for one or more circles of the star M-QAM constellation; and
applying to the phase an additional phase shift based on said one or more identifiers.

18. An optical device, comprising:
an optical modulator adapted to modulate a phase and an amplitude of an optical input signal; and
a first drive circuit adapted to drive the optical modulator based on j+1 electrical binary signals so as to cause the optical modulator to impose either a first phase shift or a second phase shift that differs from the first phase shift by about $\pi$ radians, wherein the optical device is adapted to apply $2^{k-1}$ different phase shifts based on k−1 additional electrical binary signals to further modulate the phase and produce a modulated optical output signal corresponding to a star M-QAM constellation, where j is a positive integer, k is an integer greater than one, and $M=2^{j\pm k}$.

* * * * *